Patented Apr. 17, 1945

2,374,106

UNITED STATES PATENT OFFICE 2,374,106

PROCESS FOR DYEING NYLON

Donovan E. Kvalnes, Penns Grove, and Boyce G. Carson, Woodstown, N. J., assignors to E. I. du Pont de Nemours & Company, Wilmington, Del., a corporation of Delaware No Drawing. Application February 8, 1941, Serial No. 378,062

8 Claims. (Cl. 8—42)

This invention relates to the dyeing, printing, stenciling and otherwise coloring of fibers, filaments, threads, yarns, fabrics, films and other products made from or containing the new fiber-forming linear polymeric amides which are more particularly described in U. S. Patents 2,071,250, 2,071,253, 2,130,523, 2,130,948, 2,174,527, 2,191,566 and Br. Patent 495,790 which fiber-forming linear polymeric amides will be referred to in the present specification and claims under the generic term, nylon.

In copending applications of Carothers & Godlove, U. S. Ser. Nos. 289,909, 289,910, 289,911, the dyeing of nylon with dyes which have been heretofore applied to cellulose acetate, wool, and silk is described and various articles have been published based on the inventions in the above identified applications and the work done by Carothers and Godlove describing the dyeing properties of this new fiber-forming polymeric amide which we will refer to as nylon. In all cases, however, the dyes employed are compounds which dye other fibers such as cellulose materials, wool, silk or related fibers. The water insoluble cellulose acetate dyes which have been found to exhibit desirable dyeing properties on nylon do not have the light fastness and wash fastness which is desired in many cases where the nylon fiber might be employed.

It is therefore an object of this invention to dye nylon in even shades with color compounds which do not dye other fibers and which have heretofore been used as pigments but which show affinity for nylon and exhibit improved light and wash fastness on that fiber over the dispersed colors of the cellulose acetate class.

It is a further object of the invention to provide colored nylon in which the color compounds when they are applied to the fiber are water insoluble metallic complexes of unsulfonated mono-azo dyes.

We have found that nylon can be dyed in strong and level shades with water insoluble metallic complexes of mono-azo dyes which are not sulfonated and which are therefore applied to the fiber from aqueous dispersions. We have also found that lower temperatures may be employed in the coloring of nylon with these water insoluble metallized mono-azo dyes for many of them have good affinity for nylon at temperatures as low as 170–190° F. The use of these lower temperatures is particularly desirable in the dyeing of pre-fabricated articles such as hosiery made of nylon which has been "set to shape" before dyeing, for the use of low temperatures does not cause wrinkling and the fixation of undesirable creases in a permanent set in the nylon material.

In this application the expression "dyed" is used to designate the application of the colored compounds to the nylon by a dyeing operation as distinguished from incorporation of the color compound into molten nylon prior to extrusion.

By the expression "water insoluble metallic complexes of mono-azo dyes which are not sulfonated," we refer to those mono-azo dyes in which lake-forming groups are present in the positions ortho to the azo-bridge such as —OH, —COOH, and —NH₂ which have been reacted with metallic salts of metals having an atomic weight of from 50 to 65.38 namely, vanadium, chromium, manganese, iron, cobalt, nickel, copper and zinc. These metallized azo compounds have never been considered as dyes for the known fibers and since they are colored compounds they have heretofore been used in coloring materials into which pigments could be directly incorporated, or by incorporation of the colors with organic solvents in lacquers, etc.

The water insoluble metal complexes of the mono-azo dyes derived from resorcin or from the dihydroxy naphthalenes as the coupling component are isolated from acid solutions in the manner heretofore disclosed in the prior art, for when they are isolated from alkaline solutions they are water soluble.

The colors exhibited by these compounds on nylon vary widely depending upon the constitution of the azo dye and the particular metal employed and while the affinity of the colors of this class for nylon also varies widely, as a rule they show good affinity for the fiber and exhaust from the dye bath quite completely even when the bath is used in large volumes.

An example of the general procedure which may be used in applying these colors to nylon is given to illustrate the invention, together with a list of metallic complexes of mono-azo dyes illustrating the types of compounds that may be employed. It is to be understood, however, that this invention is not limited to the methods of applications herein described or to the particular dyes mentioned for it has been found that this class of compounds as a whole dye nylon and exhibit good fastness properties.

*Example*

0.5 part of the copper complex of the dye 4-nitro-2-amino-phenol coupled to phenyl-methyl pyrazolone is ground to a thin smooth paste with 2.5 parts of a 10% soap solution. This paste is then diluted by adding 300 parts of water containing 0.2 part of soap. 100 parts of material fabricated from nylon is added to the dyebath and the temperature of the bath raised gradually to 190° F. At this temperature the material is turned frequently during 45 minutes after which it is removed from the bath, washed with warm water containing a small amount of soap and then with fresh cold water. The material is dyed a pleasing golden brown shade of excellent light fastness, of good fastness to washing, to alkaline perspiration and to hot moist pressing.

By similar procedures other unsulfonated monazo dyes containing one or more metals in complex union may be applied to nylon. In the above example the concentration of the dye may be varied in accordance with the usual practice depending upon the depth of shade desired.

The following metallized azo compounds dye nylon when applied by the procedure as above given in the following colors:

| Diazo component | Coupling component | Metal in complex | Color on nylon |
|---|---|---|---|
| 4-chloro-2-aminophenol | 1-phenyl-3-methyl-5-pyrazolone | Chromium | Brown-orange. |
| Do | do | Cobalt | Do. |
| Do | do | Nickel | Yellow. |
| 4-nitro-2-aminophenol | do | Copper | Orange. |
| Do | do | Chromium | Red-orange. |
| Do | do | Cobalt | Orange. |
| Do | do | Nickel | Red-orange. |
| Do | 2-naphthol | Copper | Blue-red. |
| Do | do | Chromium | Violet-brown. |
| Do | do | Cobalt | Red. |
| Do | do | Nickel | Red-brown. |
| Do | Resorcinol | Chromium | Garnet. |
| Do | do | Copper | Brown. |
| Do | do | Cobalt | Do. |
| Do | do | Nickel | Do. |
| Do | 2-naphthylamine | Chromium | Green. |
| Do | do | Cobalt | Do. |
| Do | 2-naphthol | Cobalt (ic) | Bordeaux. |
| 4-chloro-2-aminophenol | do | Cobalt | Blue-red. |
| 5-nitro-2-aminophenol | do | Copper | Violet. |
| Do | do | Cobalt | Grey-violet. |
| Do | do | Nickel | Red-violet. |
| Do | 1-phenyl-3-methyl-5-pyrazolone | Chromium | Red-orange. |
| Do | 2,7-aminonaphthol | do | Grey. |
| 5-nitro-4-chloro-2-aminophenol | 2-naphthylamine | Cobalt | Do. |
| 5-nitro-2-aminophenol | do | do | Violet. |
| 4-chloro-2-aminophenol | Resorcinol | Chromium | Bordeaux. |
| Do | 2-naphthol | do | Red. |
| Anthranilic acid | 1-phenyl-3-methyl-5-pyrazolone | do | Yellow. |
| 5-nitro-2-amino-phenol | 2-naphthol | do | Blue-grey. |
| Do | do | Manganese | Violet. |
| Picramic acid | 1,5-dihydroxy-naphthalene | Copper | Dark-brown. |
| Do | 1,7-aminonaphthol | do | Dull-black. |
| 4-chloro-2-aminophenol | 1,5-dihydroxy-naphthalene | Chromium | Violet. |
| 4-nitro-2-aminophenol | 2,4-dihydroxy-quinoline | Copper | Yellow-brown. |
| Do | 1,5-dihydroxy-naphthalene | Chromium | Violet. |

Unless otherwise specified in the table the metals exhibit their usual valence.

Instead of grinding the dye to a thin smooth paste with soap it may be dissolved in alcohol or other solvent and dispersed by rapidly diluting with water which may contain a small amount of soap or similar reagent.

The dyes may also be incorporated in a dispersing agent, such as dextrin, by a grinding or milling operation, and then be employed as a paste or after drying and grinding they may be used in powder form for they are readily dispersed in water particularly where a dispersing agent has been incorporated into the dextrin mass. As pointed out above, any of the metals having a molecular weight of from 50 to 65.38 may be employed in the formation of these color complexes to produce compounds that may be applied to nylon by the usual processes for applying dispersed colors to acetate silk. These dyes may be used in mixtures with the dispersed cellulose acetate dyes since they are applied to nylon by the same procedure used in applying the acetate dyes to nylon. Those compounds containing chromium, cobalt, nickel and copper are of particular interest in dyeing nylon because of their shades and general good fastness properties. The copper complexes, however, in general exhibit the best affinity and general fastness properties.

We claim:

1. Material comprising nylon in which the nylon is dyed with a metallized mono-azo dye which when applied to the nylon is in water insoluble form.

2. Material comprising nylon in which the nylon is dyed with a metallic complex of an o-hydroxy mono-azo dye which when applied to the nylon is in water insoluble form.

3. Material comprising nylon in which the nylon is dyed with a metallic complex of a mono-azo dye obtained by coupling an o-hydroxy diazo compound with resorcinol, which when applied to the nylon is in water insoluble form.

4. Material comprising nylon in which the nylon is dyed with a copper complex of a mono-azo dye obtained by coupling an ortho-hydroxy compound with resorcinol, which complex when applied to the nylon is in water insoluble form.

5. Material comprising nylon in which the nylon is dyed with a copper complex of an o-hydroxy mono-azo dye which when applied to the nylon is in water insoluble form.

6. Material comprising nylon in which the nylon is dyed with a nickel complex of an o-hydroxy mono-azo dye which when applied to the nylon is in water insoluble form.

7. Material comprising nylon in which the nylon is dyed with a cobalt complex of an o-hydroxy mono-azo dye which when applied to the nylon is in water insoluble form.

8. Material comprising nylon in which the nylon is dyed with a copper complex of the mono-azo dye obtained by coupling diazotized 4-nitro-2-aminophenol with resorcinol, which complex when applied to the nylon is in water insoluble form.

DONOVAN E. KVALNES.
BOYCE G. CARSON.